March 3, 1959 H. G. LYKKEN ET AL 2,875,956
PULVERIZER
Filed Nov. 15, 1954 4 Sheets-Sheet 4
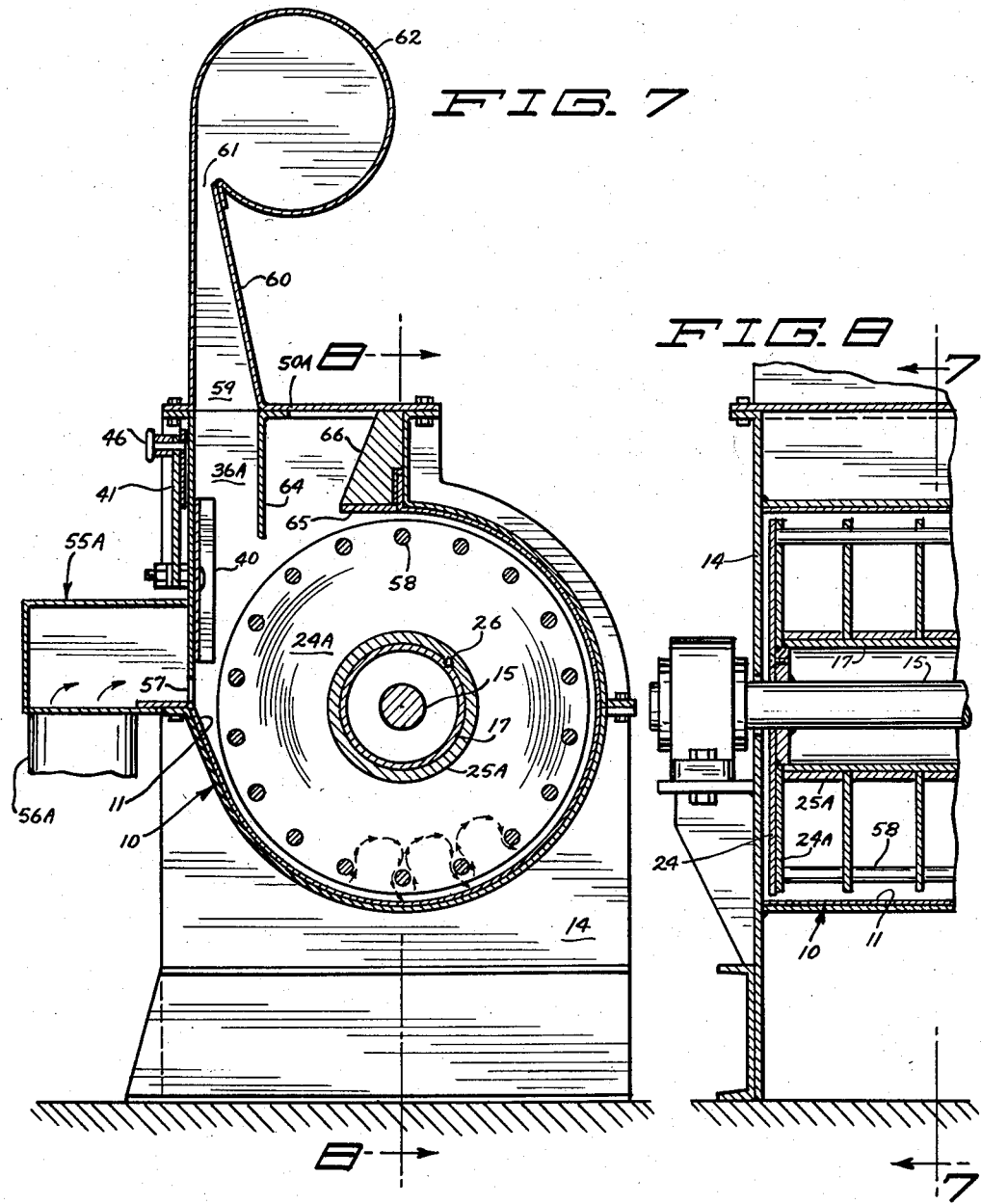
INVENTOR.
HENRY G. LYKKEN
BY WILLIAM H. LYKKEN
ATTORNEYS

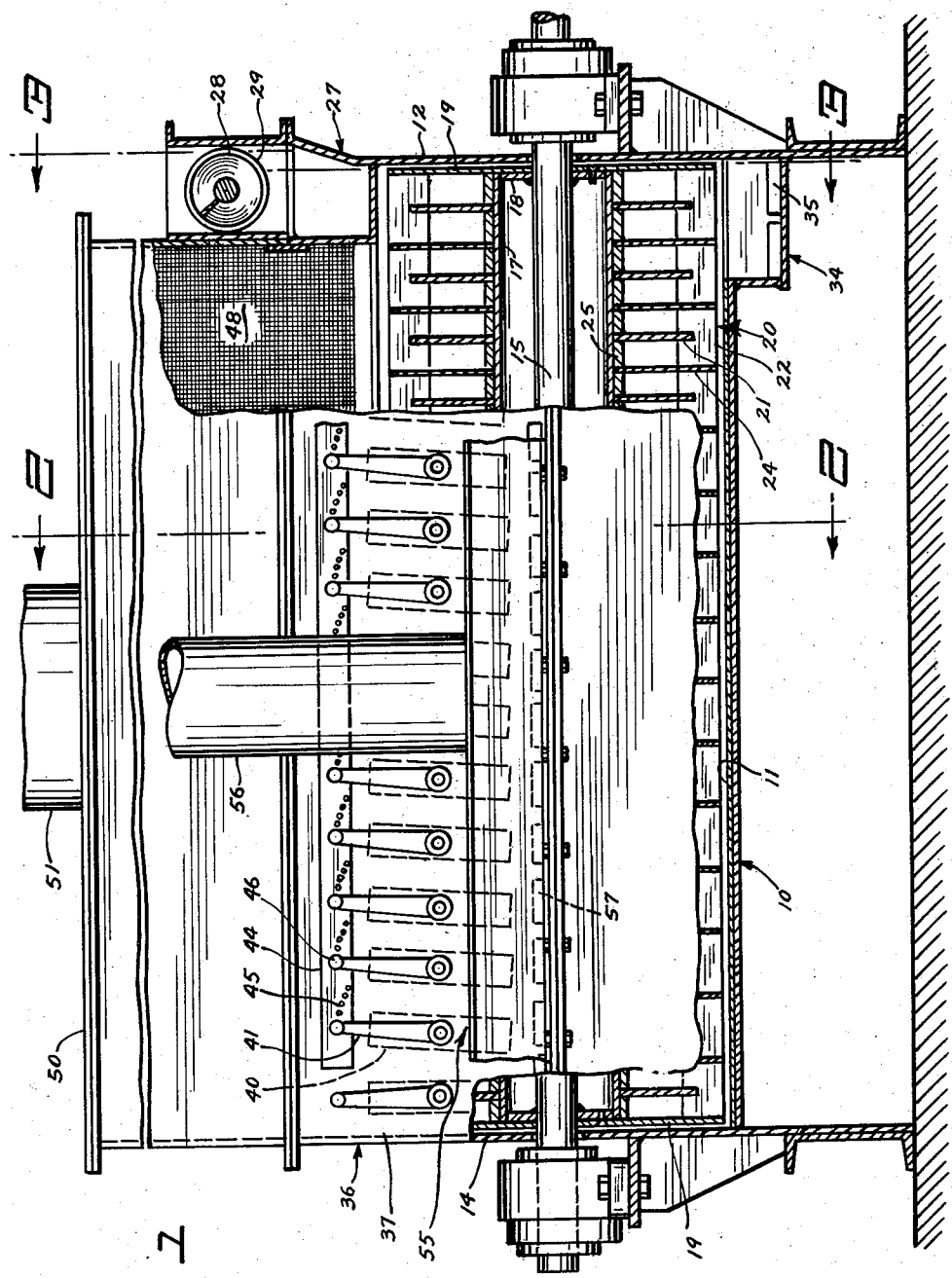

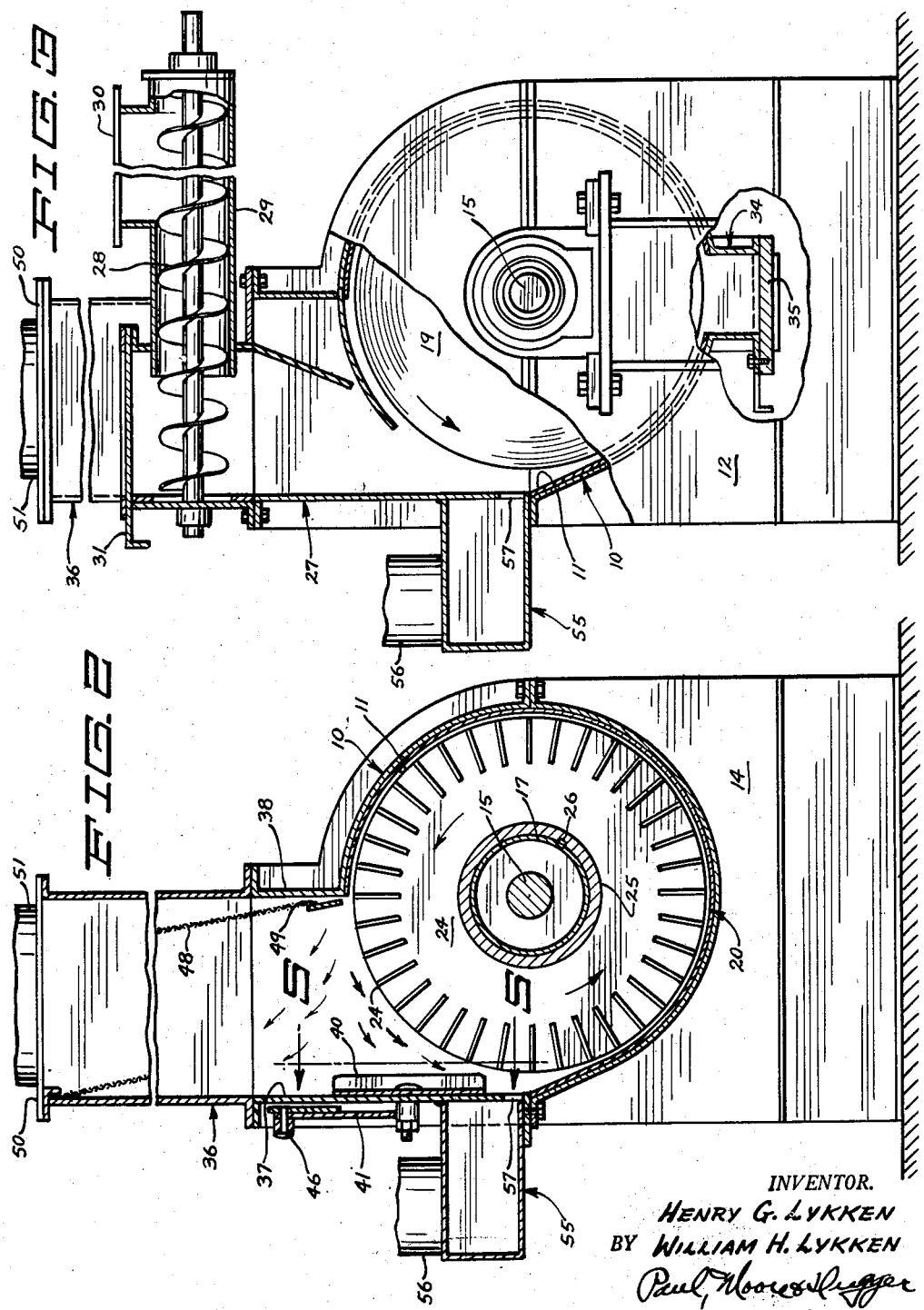

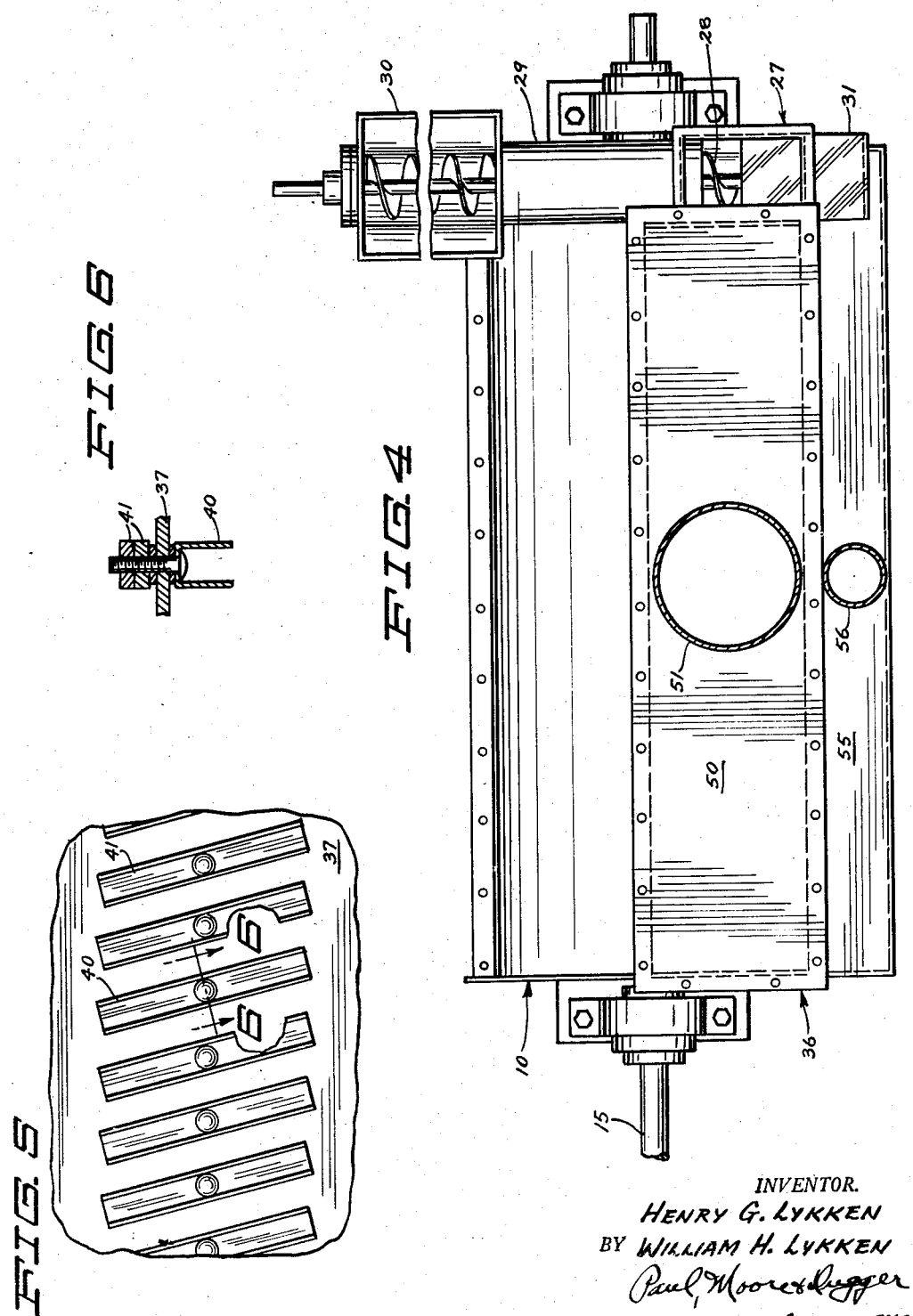

United States Patent Office 2,875,956
Patented Mar. 3, 1959

2,875,956
PULVERIZER

Henry G. Lykken, Minneapolis, and William H. Lykken, Edina, Minn., assignors to The Microcyclomat Co., Minneapolis, Minn., a corporation of Delaware Application November 15, 1954, Serial No. 468,764

8 Claims. (Cl. 241—55)

This invention relates to the art of fine grinding. More particularly this invention relates to means for reducing grains, seeds, gums, resins, dyes, catalytic material, cocoa, filter aids and a wide variety of other granular and crystalline material to specified particle size and finer with minimum over-grinding effect and minimum superfine material in the product.

This invention is related to copending application Serial No. 434,468 filed on June 4, 1954, now Patent 2,821,344 for a Self-Classifying Pulverizer and embodies features of that invention in combination with other new and novel features to effect specific new and novel results, particularly the reduction of a wide range of material in a specific manner. The main consideration in this invention is to provide means for obtaining a ground product reduced to all minus a given particle size with as little as possible reduction beyond that size, particularly as little as possible superfine.

Cocoa, for example, should be reduced to all minus 30 microns with the least possible superfine, which greatly increases fat adsorption in the making of chocolate coatings. In the processing of many dyes, catalysts, filtering material and the like uniform particle size is demanded with a minimum or no superfine. In cereal grinding it is often desired to reduce the grain down to the dimension of the unit starch cell, but with little, if any, breakage of the cell itself.

To accomplish these ends the invention provides means by which any material of the wanted particle size and finer in the feed to the pulverizer is immediately removed as it enters the grinding zone to avoid further reduction. The invention provides a rotary pulverizer and a method of grinding by which all material of the wanted size and finer is removed from the grinding zone of each revolution of the rotor.

The circulating load in the mill continuously discharges with complete extraction of the wanted particle size and finer on each revolution of the rotor. To all intents and purposes, the circulating load in the pulverizer is kept free from material which has been sufficiently reduced and prevents subjecting such material to further reduction. Under these conditions of operation the burden of overgrinding disappears along with the cushioning and dampening effect of fines in the grinding load. Grinding efficiency increases up to several hundred percent both in increased mill capacity and reduction in power requirements. There is always a major objective in any grinding operation.

This invention also contemplates novel means and method of grinding and milling cereals, such as wheat, to a fiber free product, in a series of progressive reductions utilizing the grinding apparatus of this invention, each followed by size segregation and fiber removal.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a vertical elevation of the pulverizer of this invention partly broken away to show the interior of the mill in section;

Figure 2 is a vertical section taken along the line 2—2 and in the direction of the arrows of Figure 1;

Figure 3 is an end elevation partly broken away to show in section the material inlet and grit trap, the section being taken along the line 3—3 and in the direction of the arrows of Figure 1;

Figure 4 is a top plan view of the mill;

Figure 5 is an elevation of the deflecting vanes on the interior wall of the mill, this view being in the direction of arrows 5—5 of Figure 2;

Figure 6 is a generally horizontal section taken along the line 6—6 and in the direction of the arrows of Figure 5;

Figure 7 is a vertical section similar to Figure 5, but showing a modified form of mill and rotor construction, taken generally along the line 7—7 of Figure 8; and Figure 8 is a longitudinal sectional view of the modified form of mill and rotor construction.

Broadly stated, the invention comprises (1) a method of reducing and classifying dry solid material which includes the steps of feeding a controlled supply of dry solid material tangentially to one end of a horizontally disposed generally cylindrical milling area comprised of a plurality of adjacent independent annular grinding zones; feeding a regulated flow of gas radially inwardly along a line running substantially the length of the cylindrical milling area; maintaining a fluidal suspension of the solid material in the gas; continuously grinding the solid material at least in part by attrition of particle against particle and particle against gas stream by whirling the fluidal stream of particles of the solid material entrained in the gas at high speed in an arcuate path around the outer perimeter of the annular grinding zones setting up an outer vortex action and whirling a plurality of smaller fluidal streams of particles of the solid material entrained in the gas at high speed around the inner periphery of the annular grinding zones setting up a plurality of inner vortex actions; centrifugally throwing out at least part of the particles, including the desired fines, through one quadrant of the cylindrical milling area; continuously advancing the oversize solid material sequentially from grinding zone to grinding zone through substantially the entire length of the milling area by deflecting at least part of the lower falling coarser and oversize particles angularly downwardly into the next succeeding annular grinding zone; continuously and immediately separating the desired higher falling fine particles from the lower falling coarser particles and withdrawing the fines from the milling area by entraining them in a gas flow through the centrifugal throw-out area; and (2) one form of apparatus for carrying out this method.

Referring now to the drawings, and particularly to Figures 1 to 4, there is here shown the improved classifying pulverizer of this invention. The mill comprises a generally cylindrical horizontal housing 10, preferably provided with a liner 11, which may be smooth or corrugated. Housing 10 is enclosed between two end plates 12 and 14. It will be noted that this mill is characterized by the absence of a self contained fan. End plates 12 and 14 extend to a base or floor and are affixed by floor flanges.

A suitable bearing structure is mounted at each end of the mill outside of the end plates. The details of construction of the bearings are within the province of mechanical design and need not be further explained here except to state that the bearings are preferably of the roll or ball bearing type and they are adequately sized to carry the rotor of the mill at the speeds desired and are adequately protected against the entrance of abrasive material into the bearings. Upon the bearings there is mounted a shaft 15 extending through the end plates and running the length of the entire mill forming the axis thereof. The shaft may be rotated by means of a pulley (not shown) mounted on the projecting end of the shaft and belted to any suitable motor. Alternatively, the shaft may be driven directly by direct connection to a motor of suitable design.

The shaft 15 is enlarged and reinforced through part of its length by a tube 17 supported by annular rings 18 welded or otherwise secured to the shaft. The shaft, tube and annular rings form a rigid unitary structure upon which the grinding rotor units are mounted.

A rotor end disk 19 is mounted on each end of the tube secured to annular ring 18. Mounted in series between the rotor end disks 19 are a plurality of individual independent radial blade grinding or pulverizing units 20. In the form shown in Figures 1 and 2 each unit comprises an annular disk 21 perpendicular to the shaft carrying in radial slots around its periphery a plurality of flat radial blades or vanes 22 enclosed between a pair of disks 24. Radial vanes 22 are positioned perpendicular to the slotted disk 21. Disks 24 have a diameter reaching to the periphery of vanes 22. The slotted disks 21 and disks 24 are held spaced apart by annular spacer rings 25 of appropriate length keyed at 26 to tube 17. Instead of being in the form of flat plates or vanes as illustrated, radial blades 22 may likewise be in the form of rods mounted perpendicular to the rotor disks, as shown in Figures 7 and 8, this form of construction being preferred for some purposes as will be explained in detail hereinafter.

A material inlet duct 27 is provided at one end of the mill. Duct 27 intersects one end of cylindrical housing 10. The material inlet duct 27 is provided with means for controllably feeding the material to be reduced. In the form here illustrated the feeding means comprises a screw conveyor 28 in a conduit 29 opening at one end into a feed hopper 30 and at the other end into inlet duct 27. Conveyor 28 is driven by means not shown, preferably by variable speed motor means. An auxiliary air control damper 31 is shown partly open in Figure 4 to show conveyor 28 feeding into duct 27. The material feeder is disposed transversely to the axis of the mill to permit easy removal of the top half of the mill housing for repair, replacement of worn rotor parts and the like. Auxiliary air inlet 31 is available for introducing additional air when needed, although it will normally not be used.

A grit trap is positioned in the bottom wall of housing 10 under the material inlet to collect bits of sand, stone, metal and like high density extraneous material. The trap comprises a chute or duct 34 extending downwardly from the bottom of the mill housing and having a damper closure 35 for removing the accumulated grit. Initially this trap will become filled with the material to be reduced but as grit and like material is introduced into the mill it will, because of its greater density, tend to drop to the bottom of the trap adjacent the outlet.

Extending along the remainder of the cylindrical housing 10 between the material inlet 27 and the opposite end of housing 10 is an open rectangular expansion chamber 36 enclosing approximately the upper forward quadrant of the circumference of the rotor. The expansion chamber comprises a front wall 37 which extends vertically upwardly tangentially from the cylindrical housing (as best shown in Figure 2), a back wall 38 extending radially outward and upwardly from the top of the cylindrical housing. Positioned on the inner side of front wall 37 adjacent to the rotor are forwarding elements or flow diversion means, here illustrated as a plurality of ribs or vanes 40 for deflecting the paths of the particles being reduced and advancing the material through the mill. The ribs are preferably in the form of U-shaped channels, as shown in Figure 6, pivotally mounted and adjustable from outside the mill, as for example, by handles 41. The adjustable material forwarding will be positioned in a gradient from the material inlet to the opposite end of the mill. A perforated plate 44, having a plurality of openings 45 arranged in an arc adapted to receive the movable pin from spring loaded handle knob 46 permits easy adjustment of the vanes and maintenance of the desired flow gradient.

The upper section of the expansion chamber 36 is designed to act as a primary separating chamber and extends vertically upwardly from the mill housing. Means, such as screen 48, are provided in the expansion chamber to unify air flow through the chamber and to restrain oversize and cause it to drop back into the grinding zone by gravity while allowing the wanted particle sizes to be withdrawn with the air. The screen 48, according to one form of the invention, is disposed diagonally in the expansion chamber leaving a narrow open throat 49 at the lower edge. The flow of air accompanying the moving rotor past the throat will create a slight negative pressure sufficient to prevent accumulation of material at the lower end of the screen.

The expansion chamber 36 is provided with a top wall 50 through which the chamber connects with an outlet duct 51, in turn connected with an individually driven exhaust fan or equivalent suction inducing means (not shown) to move the air flow into and through the pulverizer and out through the expansion chamber to withdraw the ground product.

The gas supply to the mill of this invention is from an air supply box 55 extending the length of the mill housing along its front at about the level of the axis of the mill. The air supply box is provided with an inlet duct 56 and a plurality of ports 57 to the mill housing. Preferably each port 57 is about the width of one rotor grinding stage and positioned at or just above the axis of the rotor. The effect is that each rotor stage is provided with its own independent air supply inlet at the point where it reloads. The supply of air is regulated by any suitable air flow control means (not shown) such as a damper in the air supply pipe or any equivalent control means.

In the modified form of construction shown in Figures 7 and 8 the flat radial rotor vanes 22 are replaced by rods 58 carried between disks 24A held properly spaced apart by spacer rings 25A. This form of construction is especially adapted for situations wherein division by impact without abrasion is desired, such as, for example, the first break of cereals wherein it is desired to free most of the fiber jacket or bran and the germ from the endosperm with a minimum reduction of the fiber, preferably no reduction of the germ and minimum reduction of the wanted material, the endosperm. In this modified form of construction the expansion chamber 36A is of reduced height. The top plate 50A is provided with a narrow throat opening 59 extending the length of the mill adjacent the front wall of the expansion chamber. An elongated inwardly tapering throat 60 communicates opening 59 with a narrower throat opening 61 in material outlet duct 62 connected to a suitable exhaust means not shown. This relatively narrow throat 60 enables easy removal of relatively coarse ground particles resulting from the first break of cereal product in the described desired manner according to this invention.

Depending from top plate 50A and extending the length of the mill is a generally perpendicular baffle plate 64 which provides for additional impact as the particles are thrown out by the rotor, directed generally by plate 65 which extends out tangentially from the cylindrical housing wall into the open quadrant forming the expansion chamber. A filler block 66 is provided to prevent accumulation of pulverant material on the shelf formed by the top of plate 65.

As shown in this modification the air inlet duct 56A to the supply box 55A may be disposed on the lower side of the box.

In the operation of the improved self-classifying pulverizer of this invention the material to be reduced is fed into hopper 30 and is introduced at a controllable rate by means of conveyor 28 into inlet duct 27. At the same time air or other gaseous fluid is introduced through the inlet duct 56 to air supply box 55 and through ports 57 to the mill at a rate sufficient to maintain the grinding load in a highly fluidal state, usually containing not more than about 10 percent solids. As the material enters it falls against the rotating blades of the rotor. Any fines in the feed material are entrained in the air stream and immediately removed. There is no axial flow of either air or material within the rotor itself, along its periphery or within what may be termed the rotor chamber.

As the material to be reduced is carried at high speed around the periphery of the rotor reduction takes place by means of a vortex of the fluid suspension of material in which reduction is principally by impact and attrition of particle upon particle, as described in United States Patent 2,294,920 issued September 8, 1942. In that patent it is explained in detail how an outer vortex is set up beyond the tips of the radial blades of the rotor by the action of the blades taking up the air and whirling it around the inside of the cylindrical housing. As the material is fed it is picked up in the whirling air in the grinding chamber and caused to circulate around with the rotor, the material being entrained and conveyed in the air currents. The particles of material entering the pulverizer are picked up by this outer vortex. Milling action occurs due to the inertia of the particles in the air moving at high speed in the vortex. The particles are constantly eroded by the high speed air currents and reduced in size by collision with other particles in its path.

By proper spacing of the radial blades 22 and 58 of the rotor intra-blade vortices are also set up. The forward travel of each blade creates a vacuum. Immediately behind the blade there is an inrush of air to fill the vacuum. That air is taken in part from the inner edge of the outer vortex which is laden with fine pulverized material. Air to fill the vacuum is also partly obtained from about the tip of the next following blade, which air slips from in front of that blade, around its tip and back into the vacuum created behind the leading blade. The following blade advancing toward the vacuum compresses and expels the air directly in front of it and this air also rushes in to fill the vacuum at very high speed due to its increased pressure. The result of these several forces will be to produce a somewhat circular high speed vorticose movement between each set of opposing faces of the radial vanes or rods. The inrush of the material-laden air to fill the vacuum created behind each blade causes innumerable high speed impacts and collisions of the particles upon each other which together with the pull against the inertia of the particles in the vortices and the very high speed of the vortical air currents result in a rapid attrition of the particles to rapidly produce large quantities of very small particles. Each rotor stage in this pulverizer is an individual grinding unit and operates individually as if each unit were enclosed in a housing of its own.

When the invention is utilized as a first break mill with the modified form of construction illustrated in Figures 7 and 8 in which rod-shaped blades 58 replace flat radial vanes 22 it may be desirable to operate the rotor at somewhat lower speeds so that the intra-blade vortices are incomplete as shown diagrammatically in Figure 7. In this manner the number of impacts of the particles against the side walls is increased while at the same time reduction by abrasion is substantially reduced.

For the efficient operation of any pulverizer it is desirable that the finely reduced material of desired size be removed from the attrition zone as rapidly as possible. Each rotor stage operating as an individual grinding unit discharges its load tangentially at the top of the grinding chamber into the expansion chamber and picks it up again at the bottom of the expansion chamber. The centrifugal throw-out effect of the rotor uopn the particles of greatest mass tends to throw these particles tangentially downwardly against the inner surface of wall 37 of the expansion chamber. The more finely ground particles of desired size and finer, which due to their lesser mass are less subject to this throw-out effect, are thrown out at a higher level. These fine particles are entrained in an air flow entering the air inlet in a regulatable amount and for the most part being carried about the rotor and upwardly out through the expansion chamber and out through the discharge outlet. The desired fines are immediately removed from the mill load and the coarser particles are returned for further reduction. In this way the burden of overgrinding is eliminated, along with the cushioning and dampening effect of fines in the grinding load, greatly increasing grinding efficiency. The top of the expansion chamber and discharge outlet are connected with an individually driven exhaust fan to move the flow of air into and through the pulverizer and out through the expansion chamber to withdraw the finished product. If necessary, additional gas supply may be admitted through damper 31 in the material inlet duct 27.

One type of separating chamber with means for separating out oversize, allowing them to drop back into the grinding zone, is shown particularly in Figure 2. This separator consists of a vertical extension of the expansion chamber and the positioning of a diagonally mounted air flow equalizing or baffle screen within the chamber, the openings of the screen being of such area that only the wanted particle size and finer will be drawn out by the air velocity through the screen. This form of separator is especially adapted for most materials in the range greater than 10 microns.

For precision classification in the finer ranges, even in the range of one micron and less, it is contemplated that the expansion chamber will be used as a primary classifier only, from which the product is passed through a precision classifier unit operated in series with the pulverizer, returning the oversize from the precision classifier to the feeder of the pulverizer.

As previously stated, the individual rotor units in this mill operate individually as if each unit were enclosed in a housing of its own. Each gets its air and material load from the bottom of the expansion chamber and discharges tangentially at the top of the rotor chamber into the same expansion chamber. Ordinarily, this would produce a continuous recirculation in the same plane, normal to the axis of the rotor. Accordingly, without some positive means to move the material through the mill the material would tend to remain at the inlet end until all of it had been reduced to fines and superfines, thus not using the remainder of the grinding area of the mill and greatly limiting the mill's capacity. Adjustable means for advancing the material through the mill are provided by pivotally mounting forwarding elements deflecting means in the expansion chamber, setting the ribs 40 at an angle from the vertical inclined downwardly toward the opposite end of the mill. As the coarser particles are thrown out against the inner surface of wall 37 of the expansion chamber they are deflected a short distance toward the opposite end of the mill before falling downwardly back into the rotor. The movement of the coarser underground material through the pulverizer can thus be controlled and varied by adjustment of the angles of deflection of vanes 40.

Because the material initially fed into the mill consists substantially entirely of larger and coarser particles the grinding load is relatively heavy. Accordingly, the deflection of the vanes from vertical toward the inlet end may be relatively great so as to rapidly move the material away from the inlet to provide room for more material. The grinding load becomes increasingly lighter as reduction takes place and the finer material is removed upwardly through the expansion chamber. The forwarding units are individually adjusted to insure a pattern of distribution that will equalize the load the full length of the rotor. The forwarding rate will vary in a gradient from full feed rate at the feed inlet end to zero at the other end as the material is progressively reduced. The grindability of the material and/or the desired fineness of the grind determines the rate of feed as well as the rate of axial flow of the material.

It will be observed that the forwarding elements provide, in effect, an individual feeder for each rotor unit, individually regulated to obtain not only the best load distribution in the mill, but also best conditions for reduction and for mill efficiency.

Ordinarily, there is no discharge outlet in the wall at the end of the mill opposite the feed inlet end because all of the material will be reduced to the desired particle size within the mill housing and will be entrained in the air stream and carried out through the expansion chamber. If special circumstances require it, however, a suitable outlet and skimmer for coarse materials may be provided in the end plate 14 at the opposite end of the mill.

The mill housing is preferably split horizontally so the top half may be lifted off and the rotor removed for cleaning, servicing, replacing or interchanging parts. The rotor is likewise designed so that the rotor units may readily be turned over to reverse their direction of rotation.

The mill may be increased in length to provide ample time of retention of material in the mill, savings in power by the use of less rotative speed and/or a more highly fluidal mill load for high efficiency grinding. Since the mill load is calculated at less than about 10 percent solids, when the mill is fully loaded the solids make a layer on the peripheral wall considerably less than the running clearance. Since this is a fluid energy mill the individual particles must be free to attain and maintain high velocities of impact.

It will be observed that a large volume of air circulates in the grinding chamber but only a relatively small amount of air is drawn through the mill, only enough to remove the finished product, thereby conserving air handling. The humidity of the air entering the mill is controlled by conventional means to provide and maintain the best conditions and temper for grinding and right moisture content in the product. Although the invention is described with air as the processing gas it will be apparent that for some purposes it may be desirable to utilize other inert gases such as carbon dioxide, helium, nitrogen or the like or even more reactive gases such as chlorine, oxygen, hydrogen or the like or mixtures of such gases.

The pulverizer of this invention is especially adapted to the progressive reduction of wheat and other cereals to fiber-free flour. Production of fiber free flour requires a series of progressive reductions and a series of grinding units.

In the first stage of flour production the whole wheat is only partially reduced or granulated to free most of the fiber jacket or bran and the germ from the wanted material, the endosperm. This husking must be done with minimum reduction of the fiber, preferably with no reduction of the germ and with a minimum reduction of the endosperm finer than about 8 to 10 mesh. The modified form of apparatus shown in Figures 7 and 8 is especially adapted for this purpose. This makes possible the separating out of most of the fiber and the germ from the granulated endosperm by present flour milling methods and means.

The mill illustrated in Figures 7 and 8, fitted with round rods instead of flat vanes, is adapted to reduce the grain by velocity impact with no cutting edges, no abrading surface and no mass rubbing of material on material. For this purpose the mill is preferably fitted with a smooth liner having a few widely spaced rounded ribs. The feed is highly fluidal containing about one part by volume of solids to ten parts air. The rotor is preferably operated at a speed to produce incomplete intra-blade vortices, as illustrated diagrammatically, in Figure 7, to provide maximum impact. This result is further facilitated by the provision of directing plate 65 and baffle 64 against which the particles are thrown. The narrow throated exhaust duct permits ready removal by adjustable suction air flow of the relatively coarse bran, germ and endosperm particles for segregation by conventional flour mill separating means. The bran and germ is removed full size as soon as it is freed. The oversize feeds back into the rotor.

The object of the first break operation is primarily to free most of the fiber and the germ with the least possible reduction of the endosperm beyond the granular stage. Even after the first break there will be considerable adhering fiber on the endosperm, on the larger particles in particular. Removal of this residual fiber requires two or more progressive reductions, each followed by size segregation and fiber removal. These subsequent progressive reductions are carried out in the same type mill employing a modified rotor and fluidal load with as little attrition as possible. The object of these reductions is merely to break the larger particles into two or three segments in a trip or two around the rotor to free more fiber with minimum reduction of the endosperm followed by immediate removal of the freed fiber. The process is repeated with minimum reduction each time. The relatively low rotor speeds used in these operations require relatively little power.

After each reduction, including the first break, a percentage of endosperm will clean up fiber-free. This material is fed directly to a high-speed flour grinding and sizing mill, such as the mill illustrated in Figures 1 and 2, preferably filled with a corrugated liner. This mill is arranged for efficient grinding to the desired top size, such as all through 325 mesh or all the dimensions of the individual starch cell without material breakdown of the starch cell. The flour will be ground and finished to any desired mesh without the waste of overgrinding, heating or power loss due to the cushioning or dampening effect of fines in the mill load. The mill remains constantly free of reduced material. Any fines in the feed are removed instantly as they enter the grinding chamber. All fines or finished product is removed the instant they are produced.

Instant removal of fines and finished product insures up to several hundred percent increase in mill efficiency as increased mill capacity and reduction in power requirements. For fine grinding the end delivery mill is preferably operated in series with a precision classifier that tails back to the pulverizer.

As many apparently widely different embodiments of this invention may be made without departing from the spirit and scope thereof, it is to be understood that we do not limit ourselves to the specific embodiments herein.

What we claim is:

1. A self-classifying pulverizer for dry solid material comprising a substantially cylindrical horizontal mill housing, a material inlet to the housing at one end thereof, a rotor journalled for rotation horizontally in said mill housing and a plurality of independent closed end radial blade vortex action grinding units mounted on said rotor within the mill housing, each of said grinding units comprising a plurality of spaced radial blades enclosed between the outer peripheries of a pair of solid annular discs, said blades being substantially perpendicular to said discs, said material inlet overlying one end of said rotor, a generally rectangular expansion chamber mounted in said cylindrical mill housing over approximately one quadrant thereof, the front wall of said expansion chamber being generally tangential to said cylindrical housing and the back wall of the expansion chamber extending radially upward from the top of the cylindrical housing, said expansion chamber being in direct fluid communication with the interior of said housing over that quadrant, adjustable forwarding elements in said expansion chamber to progressively advance the grinding load through the pulverizer, gas inlet ports extending along the length of said mill disposed in the front wall of said expansion chamber, and a material discharge outlet at the upper part of said expansion chamber.

2. A self-classifying pulverizer for dry solid material comprising a substantially cylindrical horizontal mill housing, a material inlet to said housing at one end thereof, feeder means for controlling the rate of feed to said inlet, a grinding rotor journalled for rotation horizontally in the mill housing, a plurality of independent closed end vortex action grinding units on said rotor, each of said units comprising a plurality of spaced radial blades enclosed between the outer peripheries of a pair of solid annular discs, said blades being substantially perpendicular to said discs, said material inlet overlying one end of said rotor, a generally rectangular expansion chamber mounted in said cylindrical mill housing over about one quadrant thereof in direct communication with the interior of the housing over that quadrant, the front wall of said expansion chamber being generally tangential to said cylindrical housing and the back wall of the expansion chamber extending radially upward from the top of the cylindrical housing, a plurality of adjustable material forwarding elements on the inner wall of said expansion chamber, gas inlet ports extending along the length of said mill disposed in the front wall of said expansion chamber, and a material discharge outlet at the upper part of said expansion chamber.

3. A self-classifying pulverizer according to claim 2 further characterized in that said material forwarding elements are deflecting vanes which are pivotally mounted for adjustment of the angle of deflection in the front wall of the expansion chamber.

4. The pulverizer according to claim 2 further characterized in that a diagonal fine mesh flow unifying screen baffle is positioned in said expansion chamber between the mill housing and discharge outlet.

5. The combination of a substantially cylindrical horizontal mill housing, a material inlet to said housing at one end thereof, an air inlet extending the length of said mill housing, a grinding rotor journalled for rotation horizontally in said housing, a plurality of independent closed end vortex action grinding units on said rotor, each of said units comprising a plurality of spaced radial blades enclosed between the outer peripheries of a pair of solid annular discs, said blades being substantially perpendicular to said discs, said material inlet overlying one end of said rotor, a generally rectangular expansion chamber mounted in said cylindrical mill housing over about one quadrant thereof; the front wall of said expansion chamber being generally tangential to said cylindrical housing and the back wall of the expansion chamber extending radially upward from the top of the cylindrical housing, adjustable forwarding elements in said expansion chamber to progressively advance the grinding load and a discharge outlet at the upper end of said expansion chamber.

6. A self-classifying pulverizer for dry solid material comprising a substantially cylindrical horizontal mill housing; a material inlet at one end of said housing, feeder means for controlling the rate of feed to said inlet; air inlet means disposed horizontally along the length of said housing and means for regulating the flow of air to said air inlet; a rotor journalled for rotation in the housing, a plurality of independent closed end radial blade vortex action grinding units on said rotor within said housing; each of said grinding units comprising a plurality of spaced radial blades enclosed between the outer peripheries of a pair of solid annular discs, said blades being substantially perpendicular to said discs, said material inlet overlying one end of said rotor, a generally rectangular expansion chamber mounted in the wall of said cylindrical mill housing over approximately one quadrant thereof, intersecting said wall and in direct communication with the interior of said mill housing over that quadrant, the front wall of said expansion chamber being generally tangential to said cylindrical housing and the back wall of the expansion chamber extending radially upward from the top of the cylindrical housing, a plurality of material forwarding elements on the inner side of the wall of said expansion chamber and a material discharge outlet in the upper portion of said expansion chamber.

7. The pulverizer according to claim 6 further characterized in that material forwarding elements are deflecting vanes which are pivotally mounted for adjustment of the angle of deflection.

8. The pulverizer according to claim 6 further characterized in that a grit trap is provided in the bottom wall of the cylindrical mill housing disposed immediately below the inlet end thereof.

References Cited in the file of this patent

UNITED STATES PATENTS

| | | |
|---|---|---|
| 50,975 | Whelpley et al. | Nov. 14, 1865 |
| 162,157 | Downton | Apr. 20, 1875 |
| 230,140 | Lipsey | July 20, 1880 |
| 255,150 | Downton | Mar. 21, 1882 |
| 1,384,821 | Blum | July 19, 1921 |
| 1,572,722 | Jacobson | Feb. 9, 1926 |
| 1,646,720 | Andrews | Oct. 25, 1927 |
| 1,699,849 | Lykken | Jan. 22, 1929 |
| 1,728,423 | Lykken | Sept. 17, 1929 |
| 1,789,583 | Elderkin | Jan. 20, 1931 |
| 1,793,705 | Lykken | Feb. 24, 1931 |
| 1,907,791 | Gredell | May 9, 1933 |
| 2,199,137 | Magnani | Apr. 30, 1940 |
| 2,294,920 | Lykken | Sept. 8, 1942 |
| 2,339,390 | Fowler | Jan. 18, 1944 |
| 2,546,286 | Zakel | Mar. 27, 1951 |
| 2,662,694 | Lotz | Dec. 15, 1953 |
| 2,667,905 | Tanner | Feb. 2, 1954 |